Feb. 17, 1970 D. W. GUNNARSON ET AL 3,495,605
ANNULAR INTERNAL COMPRESSION SUPERSONIC AIR INLET
Filed Sept. 29, 1965 3 Sheets-Sheet 3

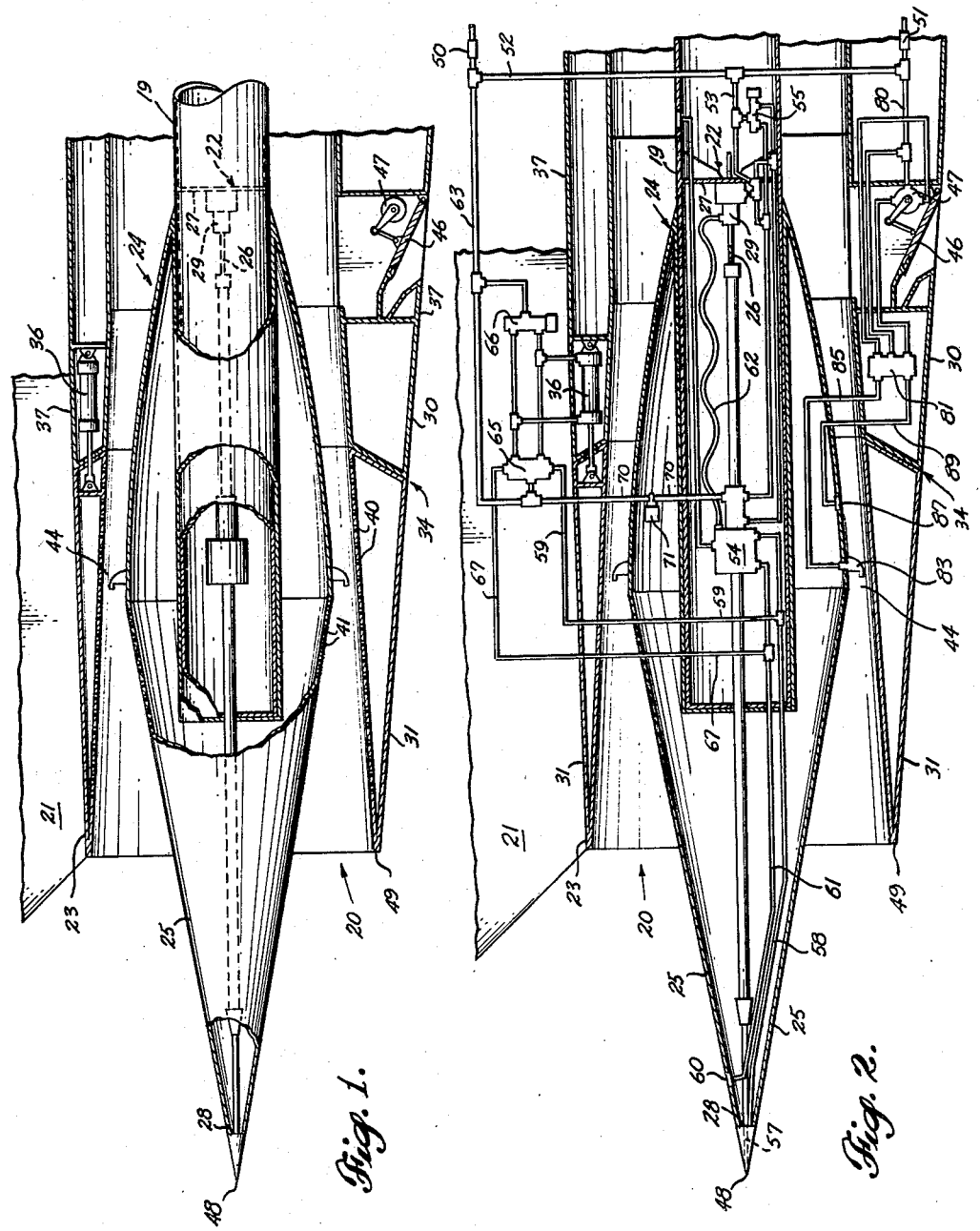

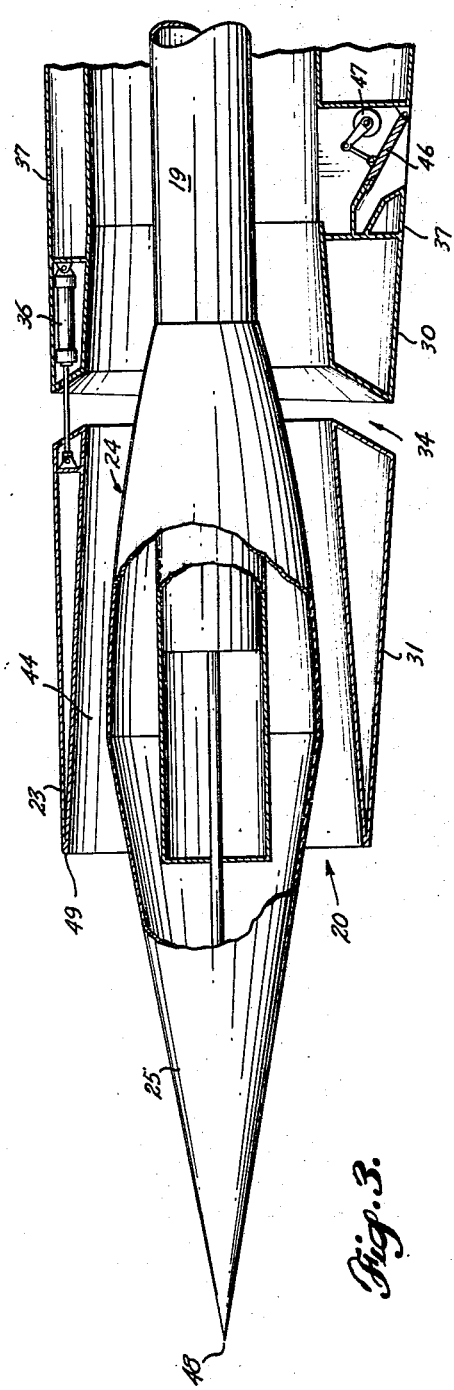

INVENTORS.
DANIEL W. GUNNARSON
CLARENCE S. HOWELL, JR.
BY
*Roy E Mattern Jr*
ATTORNEY 3,495,605
ANNULAR INTERNAL COMPRESSION
SUPERSONIC AIR INLET
Daniel W. Gunnarson, Seattle, and Clarence S. Howell,
Jr., Mercer Island, Wash., assignors to The Boeing Company, Seattle, Wash., a corporation of Delaware
Continuation-in-part of application Ser. No. 188,016,
Apr. 17, 1962. This application Sept. 29, 1965, Ser.
No. 491,222
Int. Cl. F02b 27/02; F02k 1/08; B64d 33/02
U.S. Cl. 137—15.1                                  18 Claims

ABSTRACT OF THE DISCLOSURE

An adjustable air inlet of variable geometry, for supersonic aircraft, to continuously and efficiently regulate the incoming air throughout the aircraft operating range of idle, subsonic, sonic and supersonic speeds by axially translating an inlet center body extending forwardly of the cowl inlet capture area for positioning of an external or initial shock wave front such that it extends conically between the apex of the movable center body and the leading edge of the cowl for external supersonic spillage of the air thereby regulating the engine air mass requirements.

Figure 5:
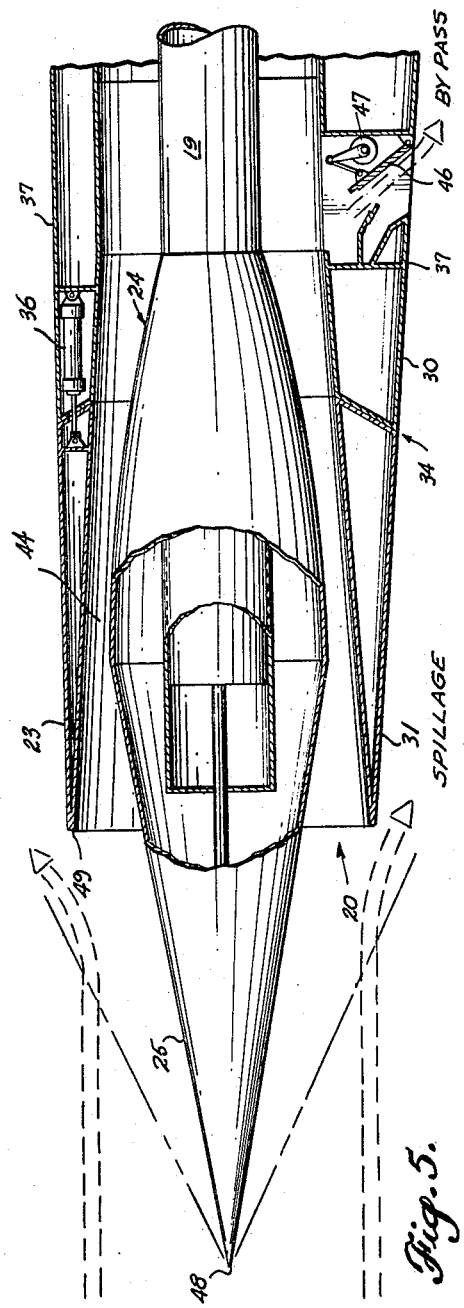

Further, controlling the annular area between the center body and the inner surface of the cowl which defines in the direction of fluid flow a converging-diverging diffuser section with the axial length of each portion of the diffuser section being dependent upon the axial position of the center body, such that a series of shock waves are positioned within the converging section to regulate the supersonic diffusion and the terminal normal shock wave is maintained within the transition section of the converging-diverging diffuser section or slightly downstream thereof by fluid by-pass means. Also for take-off or low subsonic speeds an auxiliary air inlet by a separable forward cowl section is utilized like a take-off door to increase the incoming air capture area.

---

The present application is a continuation-in-part of our earlier filed co-pending application Ser. No. 188,016, entitled "Annular Internal Compression Supersonic Air Inlet," filed on Apr. 17, 1962, now abandoned.

The invention described and claimed herein resulted from work done under a United States Government Contract A/F33 (600)–36119 and therefore, the United States Government is hereby granted an irrevocable nonexclusive license to practice and have practiced for governmental purposes the invention claimed herein.

This invention relates to air breathing engines for powering high speed vehicles and more particularly to the inlets of such engines wherein the incoming airflow is efficiently controlled as to pressure, velocity and quantity.

The purpose of the invention is to provide such an inlet which efficiently and accurately regulates the incoming air to meet all engine requirements throughout the entire range of vehicle operation, form starting, idle, take-off, subsonic, sonic and supersonic vehicle speeds.

An object of the invention is to provide an inlet which is adjustable to match engine airflow characteristics while achieving high performance through high pressure recovery and low drag.

An object of the invention is to provide inlet controls for causing inlet geometry changes establishing engine inlet airflow matching at a maximum pressure recovery consistent with reliable system operation over the entire flight regime of the airplane.

An object of the invention is to provide inlet controls and movable inlet structure having a speed of response which will not let the inlet go sub-critical when the inlet is subjected to any foreseeable engine or inlet airflow transients.

An object of the invention is to provide an inlet having a translating spike which at supersonic speeds spills air supersonically under off-design operation conditions to match the inlet capacity to the air capacity requirements of the engine.

An object of the invention is to provide an inlet having a translating spike which is shaped at its rear so that upon the spikes forward translation the inlet is contoured to provide the best operational contraction ratio for subsonic and supersonic operation.

An object of the invention is to provide an inlet having internal contours which cause deceleration of the incoming air supersonically through a combination of isentropic compression and a series of oblique shocks to the inlet throat, or minimum area section and thereafter decelerating the air subsonically to the engine compressor face.

An object of the invention is to provide an inlet having internal wall perforations in its supersonic and subsonic diffuser section, with such perforations being located just ahead of the throat and through the throat region itself, to remove low energy boundary layer air in order to improve critical pressure recovery, to lessen flow distortion and to stabilize the terminal normal shock.

An object of this invention is to provision an inlet having by-pass doors which open, as necessary, to maintain the terminal normal shock, which causes the transition to subsonic flow, just downstream of the throat; and which open completely for restarting the inlet.

An object of this invention is to provide auxiliary inlet area at take-off and low speeds by sliding cowling to open supplemental air intake passages for increasing the overall captive air capacity of the inlet.

The invention, briefly described, comprises engine air inlet structure, mechanism and controls which are interrelated for the automatic and/or manual adjustment of the effective inlet contours to meet the varying engine air requirements, such adjustments being the extension and retraction of engine air inlet structure, opening and closing auxiliary inlets by sliding cowling, and the opening and closing of by-passes.

Figure 6:
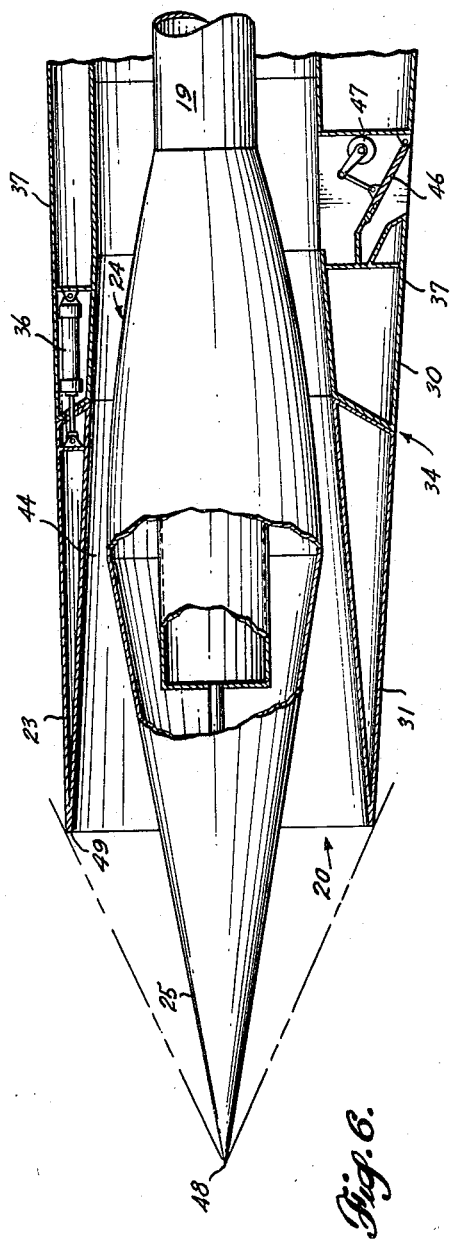

The purpose, objectives, construction and operation of the engine inlet will be understood more readily from the detailed description that follows wherein references are made to the drawings where:

FIGURE 1 is a side elevation, partially in section, of the Annular Internal Compression Engine Air Inlet, FIGURE 2 is a schematic view similar to FIGURE 1 of the inlet and controls therefor, FIGURE 3 is a schematic section similar to FIGURE 1 showing the inlet adjusted for take-off and low subsonic speeds, FIGURE 4, similar to FIGURE 3, shows the inlet adjusted for high subsonic and sonic speeds, FIGURE 5, similar to FIGURE 4, shows the inlet adjusted for part throttle supersonic speeds, and FIGURE 6, similar to FIGURE 5, shows the inlet adjusted for full throttle supersonic speeds, When a high speed vehicle such as the supersonic aircraft is to be powered, throughout the entire flight from take-off until landing, by one type of air breathing power plant such as a turbojet engine, the engine inlet stands out as a major component of such an aircraft. The inlet must handle air under all changing inlet conditions of relative speeds, pressures, temperatures and densities to match the engine air requirements which likewise are changeable as the propulsive thrust demands are varied. Where one inlet or one inlet per power plant is to be utilized its configuration must be adjustable in order to receive and prepare the incoming air for utilization within the engine, doing so with as low a drag penalty as possible. As the aircraft's speed range is widened, the inlet configuration must be considerably changed to guarantee the continuous, efficient and high performance of the power plants, in turn assuring the success of the aircraft's operation under all flight conditions.

Near sonic speeds and at substantially all subsonic speeds, especially at take-off, both inlet air mass and throat area requirements are high; whereas above sonic speeds, although the air mass requirements may increase to match below sonic requirements, the inlet throat area requirements are consistently smaller.

At all times, of course, air mass requirements vary with ambient temperature and pressure changes. The inlet, therefore, must necessarily be readily adjustable to match the air mass requirement at any particular time. Moreover, the inlet must be selectively adjustable to maintain the flow of air through the inlet by astute positioning of the shock waves as the air is decelerated and raised to higher pressures for its subsequent utilization within the power plant.

This invention concerns an inlet that meets all these operational requirements. A movable spike is utilized at supersonic speeds for regulating both external supersonic low drag spillage and the internal throat supersonic diffusion. By-pass doors located just beyond the throat are also utilized to regulate the supersonic diffusion at supersonic speeds. The engine inlet separable forward cowl section serving like a take-off door and the movable spike at subsonic speeds are both moved forward to increase the incoming air capture area.

Throughout the figures, the embodiment shown is based on pod mounted power plants. Changes within the scope of the invention would be necessary if the power plants were to be supported, for example, within the fuselage. Such changes in regard to the inlets for the most part would be concerned with the placement of inlets in and about the fuselage or in the wings, so that the inlet remains effective in the same manner in capturing and controlling sufficient air for internal compression to supply the power plants.

Referring to FIGURE 1, the inlet 20 is shown in side elevation; partially in section, with some of the surrounding associated structures and equipment such as the vehicle engine strut 21 which supports the engine, not shown, in a pod configuration 23.

The center body 24 of the inlet 20 has a translating spike 25 which is axially extendible and retractable by an actuating means 22 to control the positioning of the external shock wave pattern and to control the internal compression of the air. Movement of the spike 25 is accomplished by using the screw actuator 26 or equivalent translational method mounted on the center body support tube 19 at bracket 27 and the spike 25 at bracket 28 and powered by the pneumatic motor 29 or equivalent power source.

The outer body 30, also referred to as the cowl 30, of the inlet 20, has its forward section 31 extended and retracted to open and close supplemental air intake passages 34 to vary the overall captive air capacity of the inlet. Movement of the forward cowl section 31 is controlled by the pneumatic actuator 36 or equivalent mounted between the aft cowl section 37 and the forward cowl section 31.

Both the complementing contours of the inlet forward cowl 31 and spike 25 are uniformly provided with orifices 40 and 41 through which boundary layer air is selectively withdrawn and passed through internal ducts, not shown, past the throat 44 of inlet 20 and thereafter discharged overboard or used for another purpose such as engine cooling. As shown in FIGURE 1 the throat 44 includes the portion of least cross-sectional area defined between the inner surface of outer body 30 and the center body 24.

Beyond the throat 44, by-pass doors 46, operated by pneumatic actuators 47, open to discharge compressed inlet air overboard at supersonic flight speeds as necessary to position the terminal shock wave in the vicinity of the nozzle throat 44.

The inner surface of inlet 20 comprising the inner surface of the forward cowl section 31, as well as the surface aft thereof, is of rearwardly converging shape. The annular area between the center body 24 and the outer body inner surface defines in the direction of fluid flow, a converging-diverging diffuser section, the axial length of each portion of the diffuser being dependent on the position of the center body 24. The annular throat area 44 increases as the center body 24 is translated forward since the maximum diameter of the inner surface of cowl 30 is at the leading edge rim 49.

The coordinated operation of these movable inlet components is illustrated throughout FIGURES 3, 4, 5 and 6, which are schematic sections of the inlet components as moved relative to one another at selected speeds throughout a flight of a high speed vehicle, not shown, in order to avoid excessive drag and to preserve the airflow while matching the variable air mass requirements of the power plant, not shown.

FIGURE 3 is representative of the inlet contour configuration at take-off and at low subsonic speeds where the outer body 30, commonly referred to as the cowl 30, has its forward section 31 fully extended and likewise the spike 25 of the center body 24 is also fully extended. This arrangement of the inlet provides the maximum intake area available to the power plant for air flow through both the throat 44 and through the supplemental air intake passages 34 assuring that the large mass of air required at this critical time will be readily available for compression, mixing, and burning to meet the propulsive thrust requirements.

FIGURE 4 is representative of the inlet contour configuration where the vehicle speeds are high subsonic and sonic, for example, speeds in the range of Mach 0.5 to 1.2. The spike 25 of the center body 24 is extended and the forward section 31 of the cowl 30 is retracted resulting in sufficient area at the throat 44 to meet the engine air mass requirement for said speed range.

FIGURE 5 is representative of the inlet contour configuration where the vehicle speeds are supersonic, but less than design speed, i.e., the throttle is restricted. The cowl section 31 is retracted and the spike 25 is paritally extended.

FIGURE 6 is representative of the inlet configuration where the vehicle speeds are supersonic at design speed, i.e., full throttle, necessitating not only the positioning of the leading shock wave but also the internal terminal shock wave, keeping the latter in the vicinity of the nozzle throat 44 where it must remain during all supersonic speeds. The spike 25 for the most part is retracted, being moved only as necessary to control the leading shock position. The by-pass doors 46 are variably opened, as necessary, to control the position of the internal terminal shock wave.

At maximum demand of the air mass requirements for the power plant at the maximum Mach number, the external shock wave front extends conically between the apex 48 of the movable spike 25 to the leading rim 49 of the movable cowl 31. Under this operating condition the movable spike 25 is fully retracted and the by-pass doors 46 are normally closed.

The coordinated operation of these movable inlet components illustrated in these FIGURES 3, 4, 5 and 6 is controlled by an automatic system having manual overrides. An example of such a system is shown schematically in FIGURE 2. This system utilizes pneumatic control equipment energized during flight operations by jet engine compressor bleed air 50 and during ground servicing by ground cart compressor air 51.

During flight operations the engine compressed bleed air 50 is directed through conduit 52 and 53 to the spike actuator 29 extending the spike 25 to a distance governed by the automatic spike control 54 or directed by the pilot using the manual spike control 55. The automatic spike control 54 operates in accordance with changes in dynamic air pressures sampled by the pick up 57 located at the apex 48 of the spike 25 and transmitted to the spike control 54 through conduit 58, and, simultaneously through ratio comparisons, in accordance with the changes in static air pressures sampled by the pick up 60 located just a short distance back of the apex 48 of the spike 25 and transmitted to the spike control 54 through conduit 61; and in addition with the overriding monitoring Mach number sensing equipment, not shown, and the spike position feedback control 62.

Also during flight operations the engine compressed bleed air 50 is directed through conduit 63 to the cowl section 31 as governed by the automatic cowl control 65 or directed by the pilot using the manual cowl control 66. The automatic cowl control 65, like the automatic spike control 54, operates in accordance with ratio comparisons of the dynamic air pressure sampled by the pick up 57 and transmitted to the cowl control 65 through conduits 58 and 59, and of the static air pressures sampled by the pick up 60 and transmitted to the cowl control 65 through conduits 61 and 67, and in addition with the overriding monitoring Mach number sensing equipment, not shown.

Additional conduit 70 and a manual shut off valve 71 is provided between the cowl and spike controls to isolate the controls when necessary during maintenance checks and overhauls.

In addition, during flight operations the engine compressed bleed air 50 is directed through conduits 52 and 80 to the by-pass door actuator 47 opening the by-pass doors 46 as governed by the automatic by-pass control 81. This automatic by-pass control 81 operates in accordance with ratio comparisons of the internal dynamic air pressure sampled by the pick up 83 located on the movable spike 25 near the inlet throat 44 and transmitted to the by-pass control 81 through conduit 85, and the internal static air pressure sampled by the pick up 87 located on the movable spike 25 just beyond the inlet throat 44 and transmitted to the by-pass control 81 through conduit 89; and in addition with the overriding monitoring Mach number sensing equipment, not shown.

The components of this inlet as positioned by these controls serve to effectively supply air to the turbojet engines of a supersonic vehicle. For a vehicle designed to travel at Mach 3, for example, and having an inlet of this type which combines the efficiency of low drag supersonic spillage coupled with simultaneous variation of throat area for supersonic diffusion the following summary outlines the effective speed periods of the components and their associated controls:

Cowl positioner:
    0.0 Mach No. to Mach
        No. 0.5 _____ Cowl is in forward position.
    0.5 Mach No. and up __ Cowl is in rear position.
Spike positioner:
    0.0 Mach No. to Mach
        No. 1.4 _____ Spike is fully extended.
    Mach No. 1.4 to Mach
        No. 3 _____ Spike is partially extended, as necessary.
    At and near Mach No.
        3—full throttle ____ Spike is fully retracted.
By-pass positioner:
    0.0 Mach No. to Mach
        No. 1.4 _____ The By-pass doors and controls therefor are deactivated.
    1.4 Mach No. and
        above _____ The By-pass doors and controls therefore are activated.

For other inlets designed for use in conjunction with engines on faster or slower traveling vehicles these effective speed periods are necessarily different, yet the same operational airflow considerations will underlie the establishment of such effective speed ranges for the like components and their associated controls.

Inlets substantially arranged as illustrated and described throughout FIGURES 1 through 6, having components moved at the suggestive speeds will effectively provide area matching for efficient partial isentropic supersonic diffusion and flow matching for engine requirements.

What is claimed is:

1. An engine intake for supersonic fluid flow comprising, an outer body having a leading edge section and a convergent inner surface of a decreasing cross-sectional area extending rearwardly from said leading edge section, a center body including a spike section having a portion extending upstream and forward from the plane of the leading edge section of said outer body, said outer body containing said center body to form a passage therebetween having a throat portion, said throat portion comprising the portion of least cross-sectional area defined between said convergent inner surface and said center body, and means to move said center body to extend said spike section forwardly from the plane of the leading edge section for spilling fluid supersonically to match engine inlet requirements, said center body being shaped with respect to said convergent inner surface for simultaneously increasing the cross-sectional area of said throat portion for increasing fluid flow through said outer body when said spike section is extended forwardly.

2. An intake for fluid flow as set forth in claim 1, wherein the inner surface of the outer body and the outer surface of the center body have openings for removal of boundary layer air.

3. An engine intake for supersonic fluid flow comprising, an outer body having a leading edge section and a convergent inner surface, a center body having a spike section extending forwardly of said leading edge section, said outer body containing said center body to form an intake duct between each other having a throat portion, said throat portion comprising the portion of least cross-sectional area defined between said convergent inner surface and said center body, first means for moving said center body to extend said spike section forwardly from said leading edge section for spilling fluid supersonically to match engine inlet requirements and, said center body being shaped with respect to said convergent inner surface for simultaneously increasing the throat portion cross-sectional area when said spike section is extended forwardly, means forming a fluid by-pass duct in said outer body aft of said spike section for passing fluid from said intake duct to the exterior of said outer body, and second means for opening and closing said fluid by-pass duct means for controlling the position of a terminal normal shock wave within the throat portion of said intake duct.

4. An intake for fluid flow as set forth in claim 3 wherein said leading edge section is forwardly shiftable for supplementing fluid flow into said intake duct through a passage formed between said leading edge section and the relatively stationary remainder of said outer body, and further comprising third means to selectively extend and retract said leading edge section.

5. An intake for fluid flow as set forth in claim 4, further comprising, means sensing air pressure changes, and said first, second and third means being responsive to said air pressure sensing means.

6. An intake for fluid flow comprising, an outer body having a leading edge section and an inner surface of decreasing cross-section in the direction of fluid flow, a center body having an axially extendible spike section of increasing cross-section in the direction of fluid flow mounted within said outer body, said outer body containing said center body to form an intake duct therebetween having a throat portion, said throat portion comprising the portion of least cross-sectional area defined between said inner surface of decreasing cross-section and said center body, first means for extending said spike section forwardly from said leading edge section, said center body being shaped with respect to said inner surface for simultaneously increasing the cross-sectional area of said throat portion when said spike section is extended forwardly, means forming a by-pass fluid duct for exhausting fluid from said intake duct to the exterior of said outer body, second means for selectively opening and closing said by-pass duct means, said leading edge section being extendibly connected to a leading end of said outer body for supplementing fluid flow into said intake duct through a passage formed between said extendible leading edge section and the relatively stationary remainder of said outer body, and third means for selectively extending and retracting said leading edge section.

7. An intake for fluid flow comprising, an outer body having a leading edge section and an inner surface, said inner surface forming a passage means including, in the direction of fluid flow from said leading edge section, a convergent frusto-conical portion, a center body disposed in said passage means and having a conical spike with a portion thereof extending forwardly of said passage means, said convergent frusto-conical portion and said center body defining a throat portion of said passage means therebetween, means for extending said conical spike portion forwardly from the plane of the leading edge section, said center body being shaped with respect to said convergent frusto-conical portion for thereby simultaneously increasing the cross-sectional area of said throat portion when said spike portion is extended forwardly, and said leading edge section being extendibly connected to said outer body for forming a fluid intake passage in said convergent frusto-conical portion of said passage means and for supplementing the flow of fluid into said throat portion of said passage means from an exterior of said passage means through said fluid intake passage formed between said extendible leading edge section and the relatively stationary remainder of said outer body.

8. An intake for fluid flow as set forth in claim 7 wherein said means for extending is reversible for axially shifting said center body rearwardly in said passage means in such a manner that said spike portion is retracted and said convergent frusto-conical portion of said passage means is restricted by said center body thereby decreasing the cross-sectional area of said throat portion.

9. An intake for fluid flow as set forth in claim 7, wherein said convergent frusto-conical portion of said passage means comprises a discrete movable forward cowl section.

10. An intake for fluid flow as set forth in claim 9, further comprising means for shifting said movable forward cowl section forwardly and for retracting the same.

11. An intake for fluid flow comprising, means forming a passage, said passage means having a discrete movable forward cowl section that is forwardly shiftable for permitting supplementary fluid intake into said passage means through an intake passage formed between said forward cowl section and the relatively stationary remainder of said passage means, and fluid flow velocity responsive actuating means for shifting said movable forward cowl section forwardly at low subsonic fluid intake speeds and for retracting the same at high subsonic and low sonic fluid intake speeds.

12. An intake for fluid flow as set forth in claim 11, wherein said fluid flow velocity actuating means shifts said movable forward cowl section forwardly at fluid intake speeds ranging up to Mach 0.5, and for retracting said movable forward cowl section at fluid intake speeds ranging from Mach 0.5 to Mach 1.2.

13. An internal compression supersonic air inlet for an air breathing engine comprising, an outer body having a leading edge section, a center body contained within said outer body, said outer body and said center body defining a passage including, in the direction of fluid flow, a convergent portion, a throat portion, and a divergent diffuser portion, said center body having a spike portion disposed in and extending forwardly from the plane of the leading edge section of said outer body, and means to extend said spike portion forwardly from the plane of the leading edge section for spilling air supersonically to match engine air inlet requirements and for simultaneously increasing the cross-sectional area of said throat portion to increase the air flow through said outer body, and fluid exhaust means in said divergent diffuser portion of said passage aft of said throat portion for by-passing fluid from said divergent diffuser portion of said passage to an exterior of said passage for controlling the position of a terminal normal shock wave within said passage.

14. An intake for fluid flow as set forth in claim 13 wherein said means to extend is reversible for axially shifting said center body rearwardly in said passage in such a manner that said spike portion is retracted and said convergent portion of said passage is restricted by said center body thereby decreasing the cross-sectional area of said throat portion.

15. An intake for fluid flow comprising, an outer body having a leading edge section and means forming a passage, a center body disposed in said passage means, said outer body containing said center body to form a fluid flow intake throat area between each other, said center body having a spike portion extending forwardly of said passage means, means for extending said spike portion forwardly from the plane of the leading edge section, said center body being shaped with respect to said passage means for simultaneously increasing said intake throat area, when said spike section is extended forwardly and means forming a fluid intake passage in said passage means for supplementing the flow of fluid into said passage means from an exterior of said passage means, said fluid intake passage being formed between an extendible leading edge section of said outer body and the relatively stationary remainder of said outer body, and means for opening said fluid intake passage at low subsonic fluid intake speeds and for closing the same at high subsonic and low sonic fluid intake speeds.

16. An intake for fluid flow as set forth in claim 15, wherein said fluid intake passage has static fluid pressure pick up means located on said spike portion adjacent a leading end thereof, and said fluid intake passage has dynamic fluid pressure pickup means located on said spike portion at the leading end thereof.

17. An intake for fluid flow comprising, an outer body having a leading edge section and means forming a passage, a center body disposed in said passage means, said outer body containing said center body to form a fluid flow intake throat area between each other, said center body having a spike portion with an apex extending forwardly from the plane of the leading edge section, means for axially shifting said center body rearwardly in said passage means in such a manner that the apex of said spike portion is retracted toward the plane of the leading edge section and said center body being shaped with respect to said passage means whereby said passage means is restricted by said center body so as to decrease said intake throat area when said center body is shifted rearwardly, said body shifting means having static and dynamic fluid pick up means located on said spike portion near the apex thereof.

18. An internal compression supersonic air inlet for an air breathing engine comprising, an outer body having a leading edge section and means forming a passage, a center body disposed in said passage means, said outer body containing said center body to form a fluid flow intake throat portion therebetween, said center body having a spike portion extending forward from the plane of the leading edge section of said outer body, and means to extend said spike portion forwardly from the plane of the leading edge section for spilling air supersonically to match engine air inlet requirements, said center body being shaped with respect to said passage means for simultaneously increasing the cross-sectional area of said throat portion to increase the air flow through said outer body when said spike portion is extended forwardly, and means forming a fluid exhaust passage in said passage means for spilling fluid out of said passage means to an exterior thereof, closure means for opening and closing said fluid exhaust passage in said passage means in such a manner that fluid is spilled out of said passage means for controlling the position of a terminal normal shock wave within said passage means, said closure means having internal dynamic fluid pressure pick up means located on said center body at the maximum cross-sectional area thereof and extending outwardly into the main stream of the fluid flow in said passage means, and said closure means having internal static fluid pressure pick up means located on said center body aft of said internal dynamic fluid pressure pick up means.

References Cited

UNITED STATES PATENTS

| | | | |
|---|---|---|---|
| 2,540,594 | 2/1951 | Price | 138—46 X |
| 2,632,295 | 3/1953 | Price | 244—53.8 X |
| 2,790,304 | 4/1957 | Besserer. | |
| 2,934,893 | 5/1960 | Streeter | 137—15.1 |
| 2,938,334 | 5/1960 | McLafferty | 137—15.1 |
| 2,960,281 | 11/1960 | Jumelle et al. | 244—53.8 X |
| 2,969,939 | 1/1961 | Sulkin et al. | |
| 2,982,093 | 5/1961 | Belcher et al. | 60—270 X |
| 2,995,892 | 8/1961 | Kosson et al. | 137—15.2 |
| 2,997,843 | 8/1961 | Arnett et al. | 137—15.2 |
| 2,999,656 | 9/1961 | Ward | 244—53.8 X |
| 3,036,429 | 5/1962 | Schairer. | |
| 3,054,255 | 9/1962 | Stratford | 137—15.1 |
| 3,077,735 | 2/1963 | Johnson et al. | 60—270 |
| 2,570,629 | 10/1951 | Anxionnaz et al. | 239—265.33 |

WILLIAM F. O'DEA, Primary Examiner

D. J. ZOBKIN, Assistant Examiner

U.S. Cl. X.R.

137—15.2; 244—53